G. W. CHRISTOPH.
SEPARATOR.
APPLICATION FILED MAY 29, 1907.

927,712.

Patented July 13, 1909.

WITNESSES:
Geo. W. Packard
Edward P. Seaton

INVENTOR.
G. W. Christoph,
BY Chas. R. Schmelz
ATTORNEY.

UNITED STATES PATENT OFFICE.

GEORGE W. CHRISTOPH, OF HARTFORD, CONNECTICUT, ASSIGNOR TO THE STERLING BLOWER AND PIPE MFG. CO., OF HARTFORD, CONNECTICUT, A CORPORATION OF CONNECTICUT.

SEPARATOR.

No. 927,712.      Specification of Letters Patent.      Patented July 13, 1909.

Application filed May 29, 1907. Serial No. 376,377.

*To all whom it may concern:*

Be it known that I, GEORGE W. CHRISTOPH, a citizen of the United States, and resident of Hartford, in the county of Hartford and State of Connecticut, have invented certain new and useful Improvements in Separators, of which the following is a full, clear, and exact specification.

This invention relates to separators, and more especially to that class thereof in which an air current is employed for removing the waste material from a miscellaneous mass of solids and waste, and it has for one of its objects the provision of a machine which is especially adapted to be used in connection with products of metal-working machines.

Specifically stated, the primary object of the present device is to separate the chips or shavings from the finished product of various metal-cutting machines, as for instance the so-called screw-machines, be this product in the nature of screws, tubular parts, or turned work of any special shape, as usually cut from bar-stock in an automatic manner. Inasmuch as under these circumstances the chips removed from such stock in the form of shavings fall ordinarily together with the articles thus produced, into the bed of the machine or into a tray provided for that purpose, it has heretofore required considerable time to pick out the finished articles from the mass, and it is the particular purpose of the present invention to perform this work, by gradually feeding and subjecting the mass of material to a strong air current which will move in opposition to the gravitative descent of the several mass-components, and therefore carry away the naturally light chips and shavings, while the finished articles or products of the mass will drop into a box by virtue of their own weight.

My invention has, furthermore, for its object, the provision of a waste-receiving vacuum chamber, from which the air is exhausted for the purpose of creating an in-going current of air which carries the waste chips into said chamber.

Figure 1:
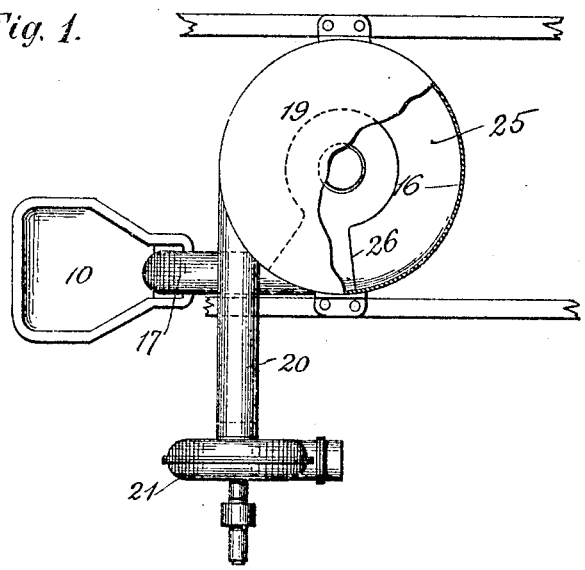
Figure 2:
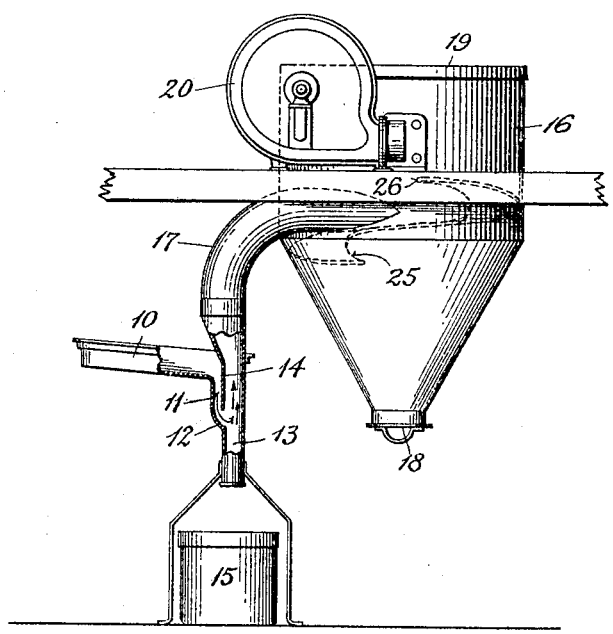

Referring to the accompanying drawings, in which similar characters denote similar parts—Figure 1 is a top view of a separator built in accordance with my invention, and Fig. 2 is a side view thereof.

In the present instance, my improved separator comprises a hopper 10, upon which the mass of chips and articles is placed, and gradually pushed forward into a conduit 11, the bottom plate 12 of which will lead the mass into a vertically-disposed intersecting pipe 13 (see Fig. 2), separated from the conduit 11 by a partition 14. The pipe 13 is open at its lower end, and a receptacle or box 15 is disposed beneath the same to receive the articles as they emerge therefrom.

The upper end of the pipe 13 is in communication with a cylindrical chamber 16 adapted to receive the chips and other light-weight residue of the mass, by means of a bend 17 which enters said chamber tangentially, so that the chips, (which are carried by a strong upward air current passing through said pipe 13 and bend 17), will have a whirling motion and gradually descend by gravity in the conical bottom of the chamber 16, instead of being projected bodily against the wall thereof, thus avoiding denting the latter and also dispensing with the noise inherent to such contact. The bottom of the chamber is closed by a cap 18, which may be removed to facilitate the withdrawal of the chips accumulated in the chamber 16.

The top of the chamber 16 is hermetically closed by a cover 19, and, connected with the upper portion of the chamber and at a point above the entrance of the inlet-bend 17, is an air-exhaust pipe 20, the other end of which terminates in an exhaust fan or similar suction device 21 of any suitable construction. This pipe 20 is also preferably tangentially disposed relatively to the wall of the chamber 16, but in a reverse direction, so that, consequently, the air-current entering the chamber through the pipe-bend 17 will practically have an upward spiral direction, while the chips will thus have ample time to drop out of the air-current and follow a downward spiral course into the bottom of the chamber 16.

From the foregoing it will be understood that, as the components of the mass are exposed to the upward and contragravity air current passing through the pipe 13, the light-weight residue and chips or shavings are readily separated from the comparatively heavy bodies of the finished articles, which can be collected in the receptacle 15, for removal.

Inasmuch as the separator may also be employed for separating metal articles from saw-dust in which they may have been "tumbled," I deem it advantageous to provide means for positively deflecting the saw-dust out of the air current entering the chamber 16, and I preferably employ for that purpose a deflector plate 25 which is so disposed that the entering air current passes below the same. In the present instance the edge 26 of deflector plate is disposed above the opening of the bend 17 into the chamber 16, and the plate is helical in form, thus carrying the centrifugally-propelled waste-matter positively downward and consequently out of the upwardly-rushing air current. This form of the deflector plate is, however, not essential, and may be changed to suit the requirements. Likewise, the actual circumferential length may be varied as desired, without departing from the spirit of the invention.

I claim:

1. The combination, with material-feeding means, and a conduit open at the bottom for the discharge of the finished product and intersecting the path of the material, of a vertical air tight cylindrical chamber tangentially connected with the upper portion of said conduit, means for exhausting the air from said chamber and comprising an exhaust pipe connected tangentially with said chamber at a point above the junction of said chamber and conduit, and means for deflecting the waste issuing from said conduit, away from the opening of the exhaust pipe.

2. The combination, with material-feeding means, and a conduit open at the bottom for the discharge of the finished product and intersecting the path of the material, of a vertical air tight cylindrical chamber tangentially connected with the upper portion of said conduit, means for exhausting the air from said chamber and comprising an exhaust pipe connected tangentially with said chamber at a point above the junction of said chamber and conduit, and an internal peripheral downwardly inclined deflector plate disposed between the air inlet and outlet openings of said chamber.

GEORGE W. CHRISTOPH.

Witnesses:
A. W. BARTON,
C. F. SCHMELZ.